United States Patent [19]
Davis

[11] Patent Number: 5,566,464
[45] Date of Patent: Oct. 22, 1996

[54] ELECTRIC MOTOR SHAFT EXTENSION GAGE

[75] Inventor: Wendell Davis, Independence, Kans.

[73] Assignee: Emerson Electric Co., St. Louis, Mo.

[21] Appl. No.: 246,811

[22] Filed: May 20, 1994

[51] Int. Cl.⁶ ........................................ G01B 7/02
[52] U.S. Cl. ................. 33/712; 33/833; 33/572; 33/655
[58] Field of Search .................. 33/710, 712, 832, 33/833, 501.6, 501.05, 655, 656, 545, 555.2, 572, 555

[56] References Cited

U.S. PATENT DOCUMENTS

| | | | |
|---|---|---|---|
| 2,377,965 | 6/1945 | Rataiczak | 33/656 |
| 3,413,726 | 12/1968 | Sankovich | 33/833 |
| 3,670,243 | 6/1972 | Fougre et al. | |
| 4,289,382 | 9/1981 | Clark | |
| 4,454,762 | 6/1984 | Clark | |
| 4,577,412 | 3/1986 | McKinney | 33/833 |
| 4,583,295 | 4/1986 | Gresock et al. | 33/555 |
| 4,590,668 | 5/1986 | Peachee, Jr. | |
| 4,993,167 | 2/1991 | Durfee, Jr. | 33/712 |
| 5,077,909 | 1/1992 | Cranor | 33/833 |
| 5,131,159 | 7/1992 | Takahashi et al. | 33/833 |
| 5,199,181 | 4/1993 | Gordin | 33/656 |
| 5,224,275 | 7/1993 | Salzberg | 33/712 |

FOREIGN PATENT DOCUMENTS

| | | | |
|---|---|---|---|
| 529775 | 8/1956 | Canada | 33/655 |

*Primary Examiner*—Thomas B. Will
*Attorney, Agent, or Firm*—Polster, Lieder, Woodruff & Lucchesi

[57] ABSTRACT

A shaft extension gage is provided at the rotor/rotor shaft insertion station in an electric motor production line. The gage includes a locating plate above which a partially assembled electric motor is positioned, a rotor shaft receiving assembly defining a chamber into which the rotor shaft is inserted, an indicator secured to the rotor shaft receiving assembly which measures shaft extension, and a display which the operator may read to determine if the shaft extension is within limits. The gage allows an operator to measure and correct both the rotor shaft's extension and end play without removing the motor from the assembly line and before the motor's end shields are attached to the motor shell to secure the rotor and rotor shaft in the shell. The gage may also be used to determine if the rotor shaft diameter is too large.

25 Claims, 4 Drawing Sheets

ELECTRIC MOTOR SHAFT EXTENSION GAGE

BACKGROUND OF THE INVENTION

This invention relates to the production of electric motors, and in particular, to a gage for use in measuring the extension of the motor's rotor shaft beyond an end shield of the motor.

Electric motors conventionally include a stator assembly and a rotor assembly contained within a shell. The shell is commonly closed by at least one end shield. The rotor assembly includes a rotor and a shaft. The shaft is journaled for rotation along bearings commonly positioned in the end shield. The rotor shaft extends from at least one end of the motor. The shaft extension is installed in, and drives, an original equipment manufacturer's (OEM's) product, such as a fan or pump. For the motor to fit in the manufacturer's product properly, the rotor shaft extension from the motor must lie within certain predetermined tolerance limits. As will be appreciated by those skilled in the art, the rotor shaft mounted in the end shield will have a certain amount of axial tolerance, commonly referred to as axial end play. The overall shaft extension and end play must be within the tolerance limits set by the OEM.

Presently, shaft extension is measured after the motor construction is essentially completed. If the shaft extension is too long or too short, the motor must be disassembled so that shims can be inserted or removed to correct the extension length, and then reassembled. If the shaft extension is still not correct, the process must be repeated. This is a labor intensive and time consuming process and adds time and expense to the production of an electric motor.

Presently, the rotor shaft end play also is manually measured after the motor manufacture is essentially completed. If the end play is not within the predetermined limits, one of the endshields must be removed so that end play shims can be added or removed to correct the end play. When the motor is reassembled, end play is measured again. If it is still not correct, the procedure must again be repeated. The need to disassemble the motor to correct end play, and then reassembly the motor is both time consuming, and hence expensive, and tedious. Further, because the end play is manually determined, the measurement is subject to human error. Because the end play and shaft extension are interrelated, the process requires several corrections. That is to say, end play tolerance, or a lack thereof, affects shaft extension tolerances. As will be appreciated by those skilled in the art, even if shaft extension is not an issue, proper end play can affect motor performance, operating characteristics, and operational life.

Shaft size or diameter also can cause problems in applicational use. As indicated above, the shaft converts electrical input to the motor to useful mechanical work. The conversion is accomplished by attaching the motor shaft to another device. If shaft size prevents that attachment, the motor is useless for its intended application.

SUMMARY OF THE INVENTION

One object of the present invention, therefore, is to provide a gage for measuring the extension of a motor's shaft beyond its endshield.

Another object is to provide such a gage which measures the shaft extension prior to closing up the motor assembly.

Another object is to provide such a gage which provides an indication of whether the shaft extends the desired distance.

Another object is to provide such a gage which may be used to measure the axial end-play of the rotor shaft prior to securing the second end shield to the motor shell.

Another object is to provide such a gage which may be used to determine shaft diameter.

Another object is to provide such a gage which is easy to operate, and which can increase motor production.

These and other objects will become apparent to those skilled in the art in light of the following disclosure and accompanying drawings.

In accordance with the invention, generally stated, a shaft extension gage is provided at the rotor/rotor shaft insertion station in an electric motor production line. The gage includes a locating plate above which a partially assembled electric motor is positioned, a rotor shaft receiving assembly defining a chamber into which the rotor shaft is inserted, an indicator secured to said rotor shaft receiving assembly which measures shaft extension, and a display which the operator may read to determine if the shaft extension is within limits. The indicator preferably includes an indicator shaft which is depressed by the rotor shaft when the rotor shaft is inserted into the chamber and a sensor responsive to the movement of the indicator shaft. The sensor creates an output which is translated into a measurement at the display. The display informs the operator whether or not the shaft extension is within its predetermined limits. The display often includes, for example, the actual measurement of the shaft extension, a comparison between the actual measurement against predetermined values in the form of a bar graph which may be easily read to determine if the shaft extension is within the predetermined limits, or simply useful indications in the form of indication lights which demonstrate to the operator whether the shaft extension is too long, too short, or within limits.

The rotor shaft typically has a threaded end so that the shaft may be connected to a device, such as a fan or pump, to drive the device. The threaded end of the shaft is of a reduced diameter, the reduced diameter defining a shoulder. With such construction, it is the distance from the end shield to the beginning of the shoulder that is critical. The indicator shaft thus preferably includes a cup at its top. The cup is sized and dimensioned so that it will fully receive the rotor shaft threads and so that the rotor shaft shoulder will engage the top surface of the cup.

In operation, the operator at the rotor/rotor shaft insertion station mounts the rotor and shaft to form a rotor assembly. The end shield and rotor assembly then are inserted into the gage to measure the shaft extension. The shaft extension can therefore be measured and corrected before the motor shell is closed up.

The gage also is used to measure the rotor shaft's end play. If the display is configured to display actual measurements, the operator can place the top end shield on the motor shell without securing it in place. He can then push down on and pull up on the rotor shaft. The gage will provide a distance for each step, and the operator can compare them to determine rotor shaft end play. If the end play is not correct, correction is simple, he need only lift off the end shield and add or remove shims as necessary.

The gage's shaft receiving assembly is preferably constructed to determine if the rotor shaft is too wide in diameter. It has a top opening through which the rotor shaft extends. This opening is machined to be equal to the largest acceptable diameter of the rotor shaft. If the shaft does not fit through the opening, the operator knows that it is too large, and therefore not acceptable.

The gage thus allows the operator to quickly and easily measure and correct the rotor shaft's extension and end play without removing the motor from the assembly line. It reduces the time needed to assemble the motor and the human error present in the manual measurements that are presently required.

DESCRIPTION OF THE PREFERRED EMBODIMENT

Figure 1:
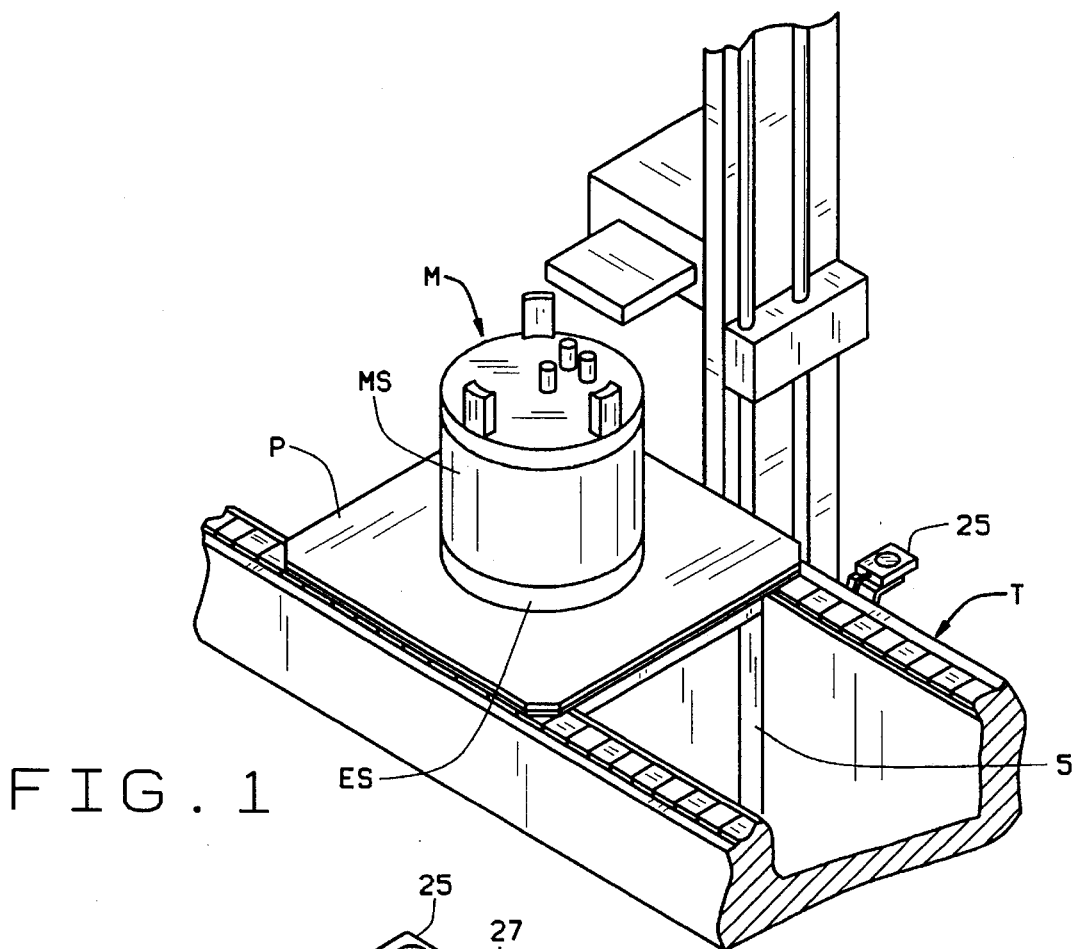
FIG. 1 is a perspective view of a partially assembled motor at a rotor insertion station of an electric motor production line.
Figure 5:
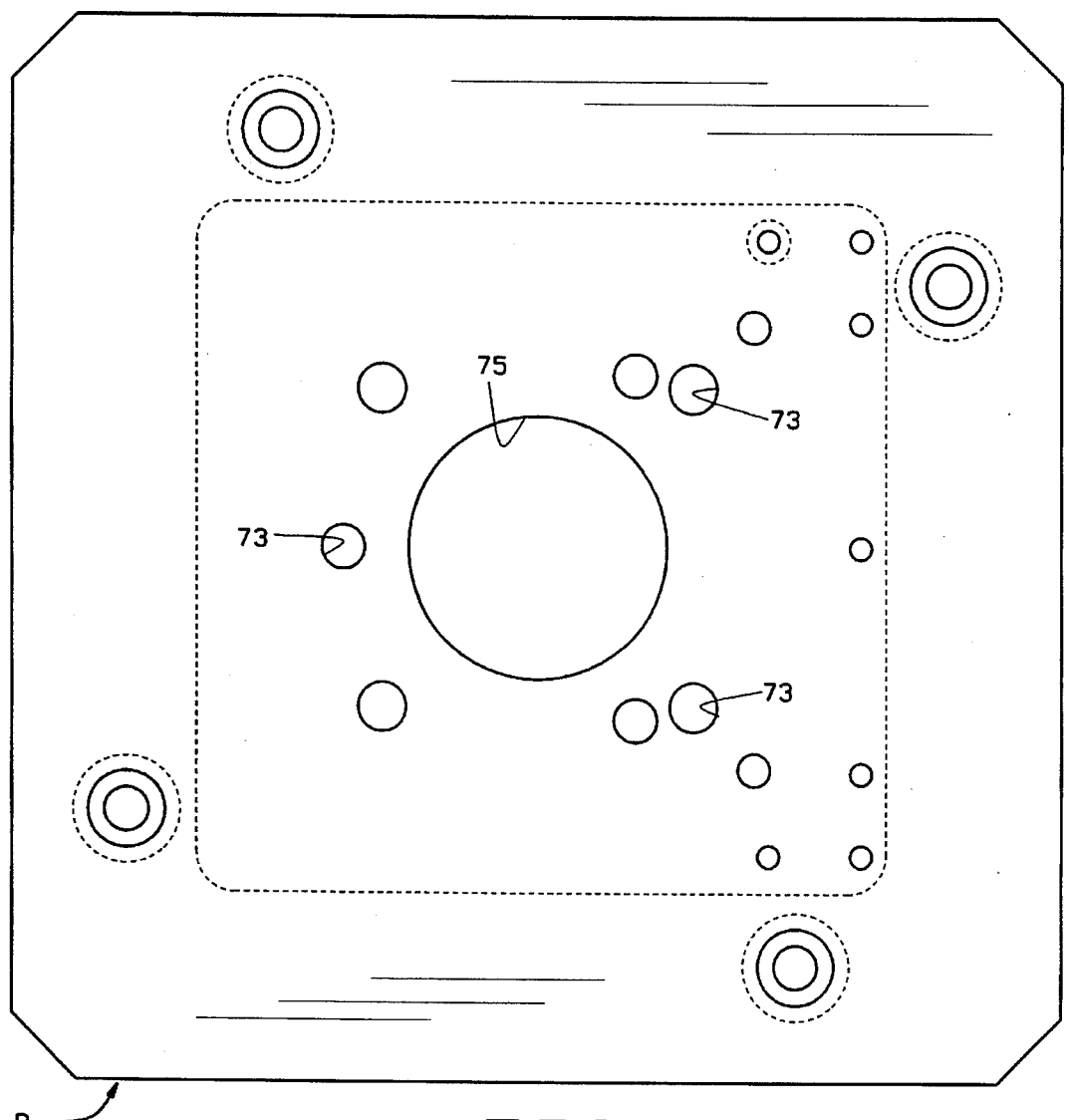
FIG. 5 is a plan view of a pallet on which motors are assembled.

Turning initially to FIG. 1, an electric motor M is assembled along a production line which includes a track T which transports motors in various stages of production along the production line. The motor is preferably produced on a pallet P (shown in plan in FIG. 5) which rides on the track.

A plurality of assembly stations are situated around the track to produce the motor, as is shown in copending application Ser. No. 246,680 filed on May 20, 1995, the disclosure of which is incorporated herein by reference. In the first stations along the production line, the bottom end shield ES and motor shell MS are put together on pallet P. At a rotor/rotor shaft insertion station S, shown in the FIGS., a rotor R and rotor shaft RS are added to the assembly. As will be appreciated by those skilled in the art, the specification provided by the original equipment manufacturer (OEM) which intends to incorporate the motor into its product, provides certain manufacturing information, including, for example, the distance that the rotor shaft may extend beyond the end shield, the axial end play of the rotor shaft, and the diameter of the rotor shaft. These dimensions all must fall within predetermined limits or tolerances specified by the OEM or the motor physically cannot be assembled in the OEM's product. A gage 1 at the rotor/rotor shaft insertion station S is provided to measure rotor shaft extension, rotor end play, and shaft diameter.

Figure 2:
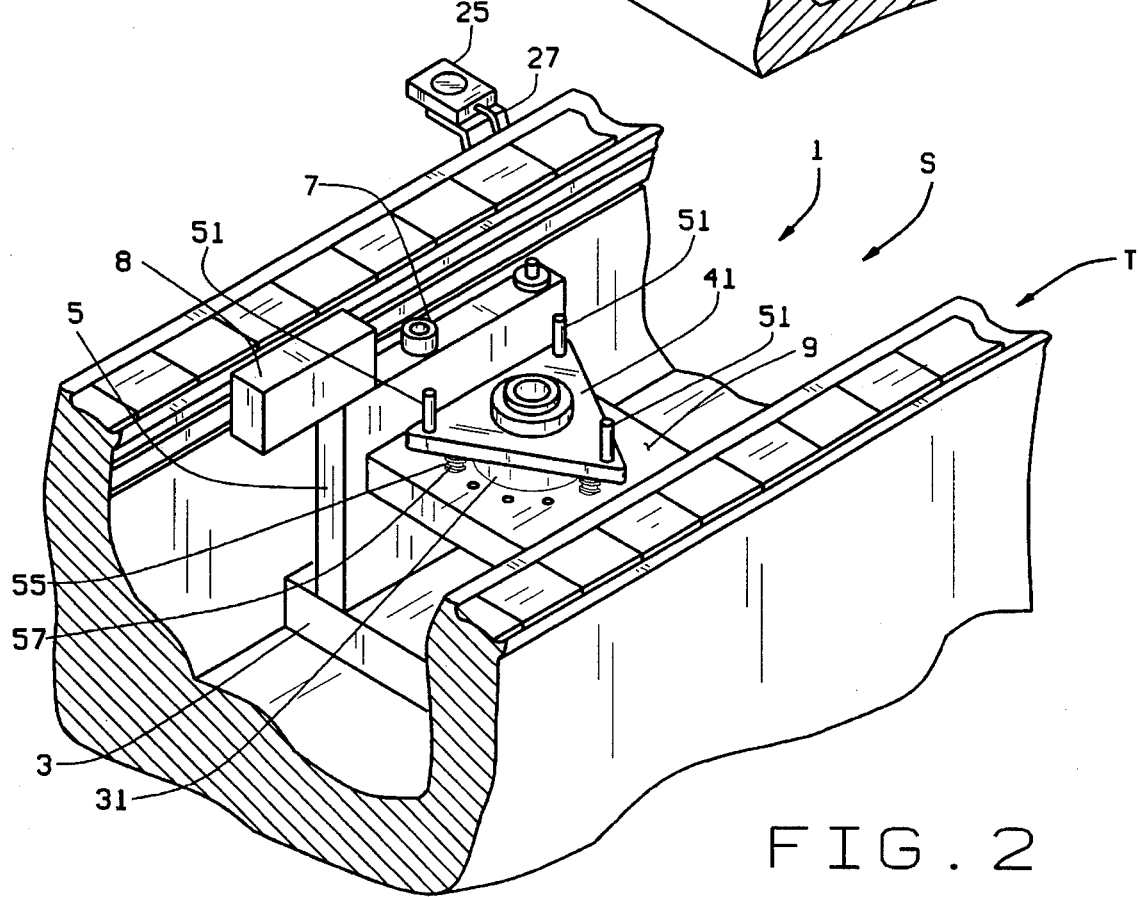
FIG. 2 is a perspective view, partly broken away, of one illustrative embodiment of a shaft extension gage of the present invention used at a rotor insertion station, with the gage in a lowered position, the motor being removed for ease of illustration.
Figure 3:
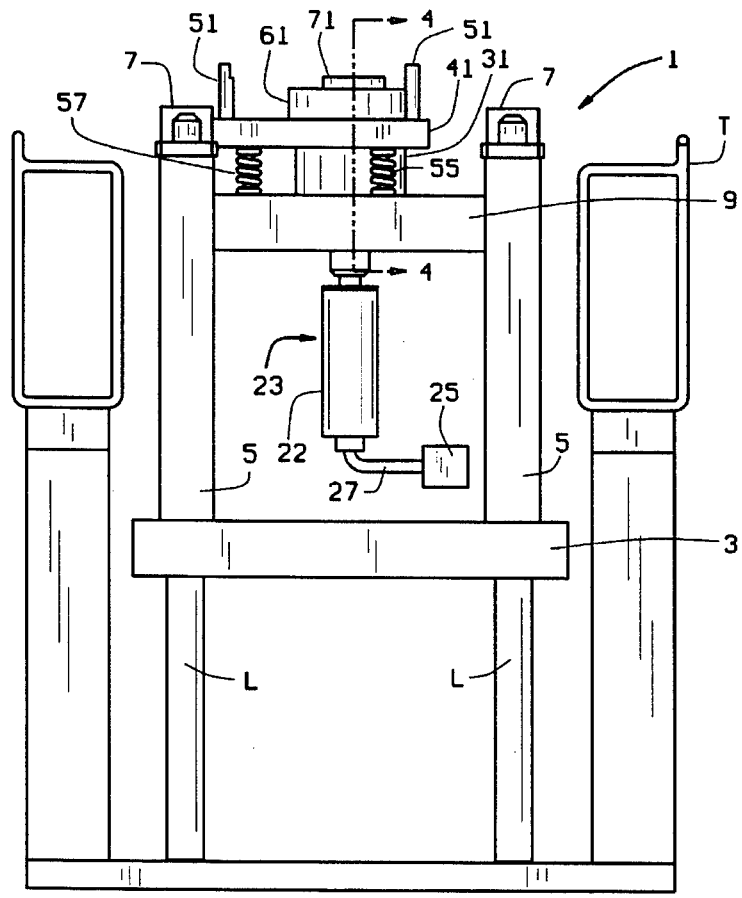
FIG. 3 is a view in side elevation of the shaft extension gage of the invention, with the gage in a raised position, the motor being removed for ease of illustration.

Gage 1, which is positioned between the tracks T, includes a base 3 which sits upon lifts L (FIG. 3). Lifts L are operable to raise and lower the gage. A pair of spaced apart pallet lift plates 5 extend upwardly from the top of base 3. Plates 5 are generally rectangular, having a length approximately equal to the length of base 3. The lift plates 5 extend upwardly from base 3 until the top surfaces of the plates are approximately even with the bottom of the track T, when the gage is in a lowered position, as is best seen in FIG. 2. Bumpers 7 are secured to the tops of the plates 5. When the gage 1 is raised by lifts L, bumpers 7 engage the bottom of the pallet P, and provide a frictional surface to prevent the pallet from sliding while the motor is being assembled at the station. A sensor 8, which is operatively connected to the lifts L, is also mounted on lift plates 5. Sensor 8 activates the lifts L when it determines that the pallet is in position above the gage 1, to lift the gage 1.

Figure 4:
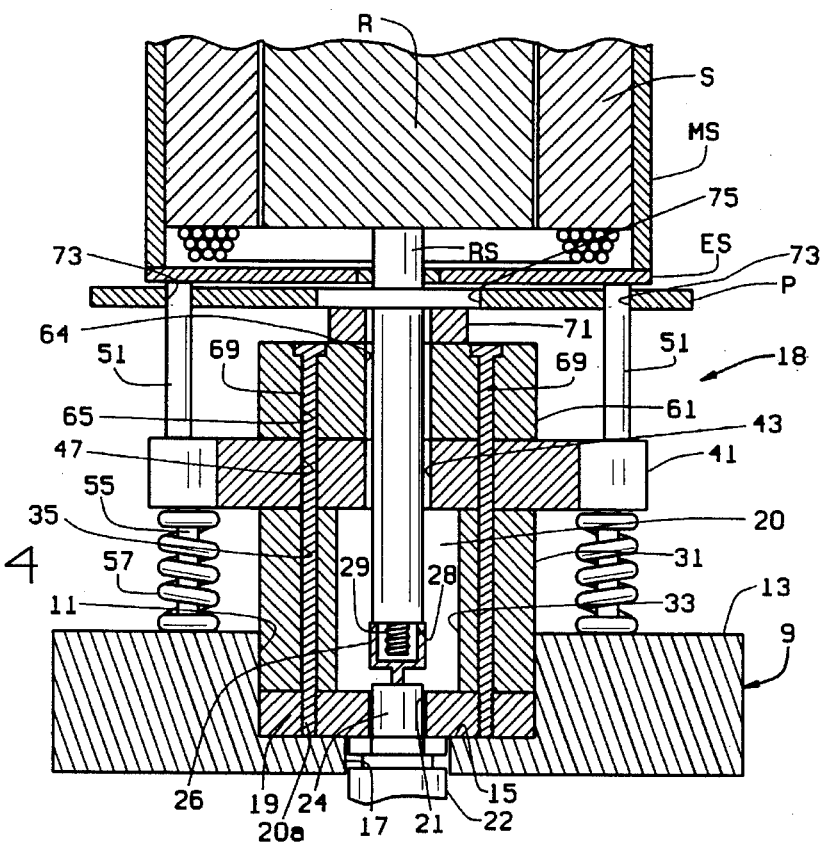
FIG. 4 is a cross-sectional view of the shaft extension gage of the invention, taken along line 4—4 of FIG. 3, but including an illustrative embodiment of certain motor parts mounted in test position.
Figure 6:
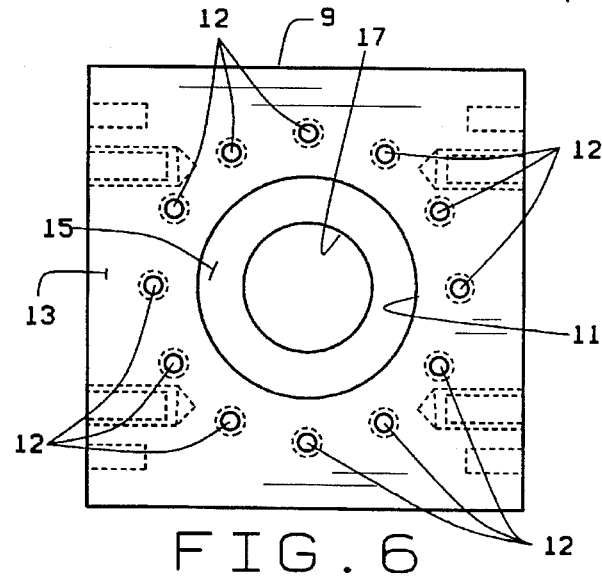
FIG. 6 is a plan view of a gage support of the gage.

A gage support 9 is secured to, and extends between, plates 5 above base 3. As seen in FIG. 4, gage support 9 has a bore 11 formed in its upper surface 13 and a plurality of bores 12 (FIG. 6) evenly spaced about opening 11. Bore 11 has a bottom 15 which, in turn, has a bore 17 extending through it. Bore 17 is concentric and coaxial with bore 11.

A rotor shaft receiving assembly 18, which is seated in bore 11, has openings at its top and bottom and defines a chamber 20 into which rotor shaft RS is inserted. Assembly 18 includes an indicator mount 19, an indicator extension 31, a locating plate 41, a bushing mount 61, and a bushing 71.

Indicator mount 19 is seated on floor 15 in support bore 11 and defines the bottom of assembly 18. Mount 19 has a through bore 21 which is concentric with the bores 11 and 17 of the gage support 9 and defines the bottom opening of the assembly 18. Two pair of bolt holes 20 and 20a extend through mount 19. Each pair of bolt holes includes two bolt holes spaced 180° apart. Bolt holes 20 and 20a are spaced apart by approximately 45°.

An indicator 23 depends from assembly 18. Indicator 23 includes a body 22 which extends through support bore 17 to be secured to mount 19 in bore 11. Indicator 23 has a spring biased shaft 24 (FIG. 4) which extends from body 22 through bore 21 of the indicator mount 19 and into chamber 20 of assembly 18. Indicator 23 is preferably an indicator such as is available from Federal Products Co. of Providence, R.I. under the name MAXUM, or which is described in U.S. Pat. Nos. 4,289,382 and 4,454,762, which are incorporated herein by reference. When the shaft is depressed, it exerts a force on a pressure sensing device. The pressure sensing device creates an electrical output. The strength of the output is proportional to the distance which the shaft was depressed. The output is converted to an electrical signal which is displayed on a remote display 25 which is positioned adjacent track T to be easily viewed by an operator. Display 25 is connected to indicator 23 by a cable 27. Preferably, display 25 is configured to display the distance the indicator shaft was depressed in inches. The display, however, could be configured to have a graphical display, such as a bar graph.

In the motor embodiment illustrated, rotor shaft RS has a threaded end portion 29 (FIG. 4) so that the rotor shaft may be operatively connected to a fan, for example. End portion 29 is narrower than the shaft RS, and thus, the end portion and shaft define a rotor shaft shoulder 28. A cup 26 is removably secured to the top of indicator shaft 24. Cup 26 is sized so that the threads of rotor shaft RS are fully received therein, so that the shoulder 28 of the rotor shaft will contact the top surface of the cup. Thus, the shoulder, and not the end portion 29, will contact the cup, and it is the shoulder 28, not the end portion 29, which presses down on the indicator shaft 24 through the cup 26.

Figure 9:
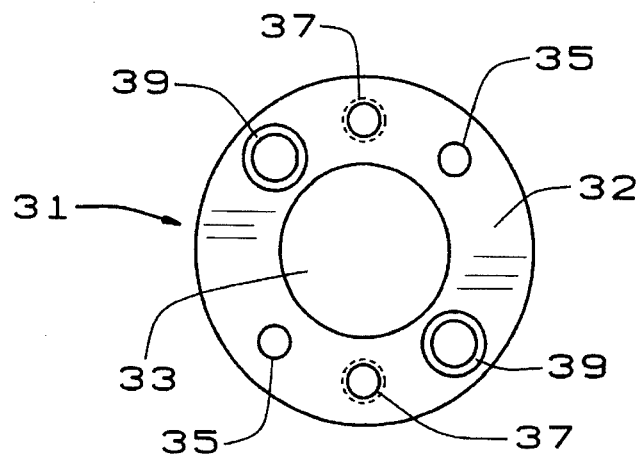
FIG. 9 is a plan view of an indicator extension of the gage.

Indicator extension 31 is secured to the top of gage mount 19 and extends upwardly out of support bore 11. Extension 31 is a hollow cylinder. Extension 31 has an annular wall 32 (FIG. 9) defining a central opening 33 which is coaxial with indicator mount opening 21 and three pair of bolt holes 35, 37, and 39 formed in wall 32. Bolt holes 35 and 37 extend through wall 32 and are aligned with bolt holes 20a and 20, respectively, of indicator mount 19. Bolt holes 39 are preferably blind bores. A first pair of bolts (not shown) extend though bolt hole 37 into bolt hole 20 to secure the extension 31 to mount 19. The extension and the mount thus form one piece of the assembly 18, and could, alternatively be machined or molded as a one-piece item, rather than as a multiple piece item.

Figure 7:
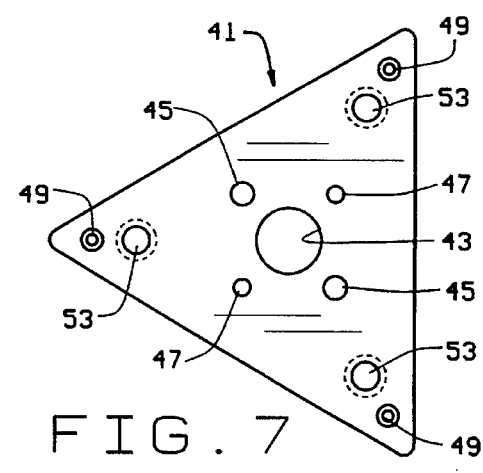
FIG. 7 is a plan view of a locating plate of the gage.
Figure 8:
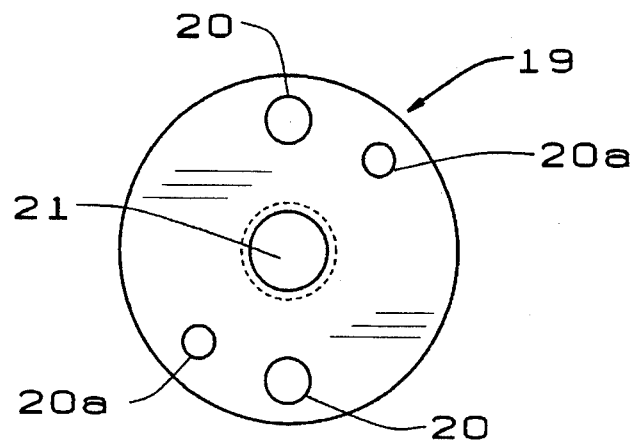
FIG. 8 is a plan view of a gage mount of the gage.

Locating plate 41 is mounted to extension 31 to be generally horizontal and level. Locating plate 41 is preferably triangular (as seen in FIG. 7), however, it could be formed in any other desired shape. Locating plate 41 has an opening 43 formed in it. The opening 43 is in coaxial alignment with opening 33 of extension 31. A pair of bolt holes 45 and 47, respectively, are formed in and positioned about opening 33. The bolt holes 45, 47 are aligned with bolt holes pairs 39 and 35, respectively, of extension 31. Three bores 49 are positioned at the corners of plate 41, on the upper surface thereof, to receive upwardly extending locating pins 51 (FIG. 4). Through bores 53 (FIG.7) are positioned inwardly of bores 49 and receive bolts 55 which extend upwardly from support plate 9. Bolts 55 are threaded into bores 12 of the supporting plate 9. Locating plate 41 is not secured to bolts 55. Bores 49 are slightly larger than bolts 55, and plate 41 may thus slide vertically relative to the bolts. The bolt holes 49 are counter sunk to receive the heads of the bolts so that the plate 41 does not slide off the bolts. The provision of a multitude of bores 12 on support plate 9 allow s for the plate 41 to be mounted above plate 9 in several different positions. A spring 57 is journaled about bolt 55 to bias the locating plate 41 upwardly.

Figure 10:
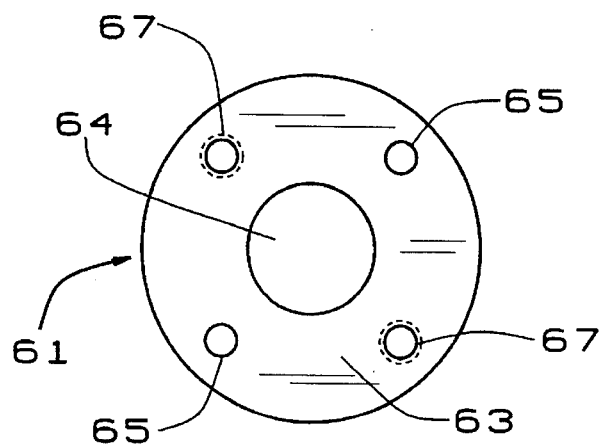
FIG. 10 is a plan view of a bushing mount of the gage.

A cylindrical bushing mount 61 is attached to the top surface of indicator plate 41. Bushing mount 61 has an annular wall 63 (FIG. 10) defining a central opening 64 which is concentric with locating plate opening 43. Preferably, openings 64 and 43 are of the same diameter and are equal in diameter to the largest allowable diameter of the rotor shaft. The bushing support 61 and locating plate 41 thus act as a gage which will reject oversized rotor shafts or shafts which have burrs thereon which will make them too large.

Two pair of bolt holes 65 and 67 (FIG. 10) extend through bushing support wall 63 and are aligned with extension bolt holes 35 and 39, respectively. A second pair of bolts (not shown) extend through holes 67 into extension bolt holes 39 to secure bushing mount 61 and locating plate 41 to extension 31. A third pair of bolts 69 extend through bolt holes 65, 47, 35, and 20a, to hold locating plate 41, extension 31, and gage mount 21 together. The use of three sets of bolts to secure the assembly 18 together in parts, and then as a whole, facilitates access to the indicator cup 26 so that it may be changed if necessary. By removing the bolts 69, the top portion of the assembly 18 can be removed as a single unit, rather than as two pieces. A bushing 71 is attached, for example by bolts (not shown), to the top of mount 61.

The elements of the gage are sized so that, when the gage is not raised, the top of bushing 71 and the top of the locating pins 51 are slightly above the top of bumpers 7. The assembly 18 is not secured in support plate bore 11. The springs 55 thus bias the whole assembly 18 upwardly, so that the assembly will "float" above support plate 9.

In operation, when a partially assembled motor M is brought to the rotor/rotor shaft insertion stations, the pallet is stopped and lift L raises gage 1 upwardly. The locating pins 51 extend into openings 73 of pallet P to contact the machined, or bottom, surface of the motor end shield ES. Pallet P has an opening 75, which is concentric about bushing 71. The rotor and shaft have previously been assembled together to form the rotor assembly. The operator places the rotor assembly into the shell, so that the shaft passes through the end shield ES into assembly chamber 20. The stator S, at this point, has been previously inserted into the shell. The threaded end 29 of the rotor shaft enters the indicator shaft cup 26 and the shoulder 28 of the rotor shaft contacts the cup's top surface. The weight of the rotor and rotor shaft will depress the indicator shaft, and, as described above, the indicator will produce an output which will be displayed on display 25. Preferably, the display gives a digital readout of the actual shaft extension. The display is situated so that the operator may easily read it. By reading the display, the operator can determine if the shaft extension beyond the end shield is too long, too short, or within acceptable limits. If it is not within limits, the operator can remove the rotor and rotor shaft, and add or subtract shims, as necessary, so that the shaft extension is within its predetermined limits. This allows for the shaft extension to be measured, and corrected if necessary, prior to closing up the motor assembly.

As noted above, the top opening of assembly 18 has a diameter equal to the largest acceptable diameter of the rotor shaft. If the rotor shaft RS is oversized, it will not pass through the opening and the indicator will not be activated to activate display 25. The operator will thus know that the shaft is not an acceptable shaft. The operator can thus remove the shaft inserted, and insert a new shaft.

The indicator also allows for the operator to measure end play of the shaft before the top end shield is bolted in place. After the shaft extension is found to be within the predetermined limits, the operator places the top end shield on the motor shell. Before the top end shield is secured, the operator can measure the end play simply by taking two separate shaft extension measurements. As is known, the axial end play allows the rotor shaft to move axially relative to the end shield. Thus, by moving the rotor shaft, the shaft extension changes. Therefore, the operator depresses the rotor shaft to measure the shaft's maximum extension and then pulls up on the rotor shaft to measure the minimum shaft extension. The difference between the two measurements is equal to the amount of end play present in the rotor shaft and the operator can compare the two measurements to determine the end play present in the shaft. If the end play is not within predetermined limits, the operator can remove the top end shield, add or remove end play shims as necessary, and then replace the end shield. Once the end play is found to be within limits, the top end shield can be secured in place using through bolts, as is known. The indicator thus allows for the measurement of rotor shaft end play without the need to remove the motor from the assembly line. This reduces the time necessary to check the end play, and reduces the human error involved in measuring the end play.

As can be appreciated, the gage 1 of the present invention provides for a quick measurement of both the rotor shaft extension and the end play present in the rotor shaft, without the need to remove the motor assembly from the assembly line. Indicator 23 electronically measures the shaft extension, and thus reduces the error, which is present when measurements are made manually. The gage will also reject rotor shafts which are have too large a diameter.

Variations within the scope of the appended claims will be apparent to those skilled in the art. Linear measuring devices could used in place of the indicator 19, as could optical measuring devices. Optical measuring devices could additionally be used to measure the diameter of the rotor shaft to ensure that the rotor shaft does not have too small a diameter. The locating plate need not be triangular, and more locating pins 51 could be used if desired. Further, instead of using bolts which secure the busing mount and locating plate to the indicator extension and separate bolts to secure the indicator extension to the indicator mount, bolts, such as bolts 69, could be used which extend through the complete assembly to secure it together. The assembly 18 need not be made of only two parts, rather than the four parts it is presently made of. These examples are merely illustrative.

I claim:

1. A gage for measuring extension of a rotor shaft beyond an end shield of a partially assembled electric motor comprising:

a rotor shaft receiving assembly arranged to define a chamber into which the rotor shaft is inserted, said assembly further defining an upper opening and a lower opening for accessing said chamber, said rotor shaft being insertable through said upper opening;

an indicator secured to said rotor shaft receiving assembly, said indicator including an indicator shaft extending into said chamber through said lower opening, said indicator shaft being depressed by said rotor shaft when said rotor shaft is inserted into said chamber, said indicator including a sensor responsive to the movement of said indicator shaft for creating an output indicative of the length of said rotor shaft extension; said indicator including a cup on a top of said indicator shaft, said rotor shaft having an end portion narrower than said rotor shaft, said rotor shaft and said end portion defining a rotor shaft shoulder; said cup receiving said rotor shaft end portion, said rotor shaft shoulder contacting an upper surface of said cup; and a display, operatively connected to said indicator sensor, which provides an image indicating whether the rotor shaft extension falls within predetermined limits.

2. The gage of claim 1 wherein said display displays the length of said rotor shaft extension.

3. The gage of claim 1 wherein said cup is removably secured to said indicator shaft.

4. The gage of claim 1 including a gage support, said rotor shaft receiving assembly being seated on said gage support.

5. The gage of claim 4 wherein said rotor shaft receiving assembly includes a locating plate spaced above said gage support, said gage including bolts extending upwardly from said gage support to said locating plate and springs journaled about said bolts between said support plate and said locating plate; said locating plate being slidably journaled on said bolts, said springs biasing said locating plate and hence said gage upwardly.

6. The gage of claim 5 wherein said rotor shaft receiving assembly includes at least an upper part and a lower part said chamber being defined, at least in part by said lower part; said upper part including said locating plate; said upper part being removably secured to said lower part to provide access to said indicator shaft within said chamber.

7. The gage of claim 5 wherein said gage is positioned in an electric motor assembly line, said motor being assembled on a pallet; said pallet defining a central opening through which said rotor shaft is extendable.

8. The gage of claim 7 including locating pins extending upwardly from said locating plate, said pallet including through holes alignable with said locating pins.

9. The gage of claim 8 wherein said assembly line includes a lift, said gage being positioned above said lift, said lift being operable to raise said gage to a position where said locating pins extend through said holes in said pallet and contact a surface of said motor.

10. A gage for measuring extension of a rotor shaft beyond an end shield of a partially assembled electric motor, said gage including:

a gage support including an aperture and a locating pin extending upwardly from said gage support;

a locating plate including an aperture coaxial with said gage support aperture, said locating plate being slidably mounted on said locating pin to be movable vertically relative to said gage support;

an indicator mount including an aperture coaxial with said gage support aperture, said indicator mount being connected to said locating plate in a spaced apart relationship thereto, said indicator mount and locating plate defining a space therebetween into which said rotor shaft is insertable; said rotor shaft being insertable through said aperture of said locating plate;

an indicator mounted to said indicator mount and including an indicator shaft which extends into said space through said indicator mount aperture, said indicator shaft being in alignment with said rotor shaft to be engaged by said rotor shaft when said rotor shaft is inserted into said gage, said indicator shaft being depressed by said rotor shaft when said rotor shaft is inserted into said gage, said indicator including a sensor responsive to the movement of said indicator shaft and creating an output indicative of the length of said rotor shaft extension; and a display, operatively connected to said indicator sensor, which provides an image indicative of a property of the shaft extension.

11. The gage of claim 10 wherein said shaft extension property is the length of the shaft extension.

12. The gage of claim 10 wherein said shaft extension property is end play of said shaft extension.

13. The gage of claim 10 including a spacer, said spacer separating said locating plate and said indicator mount.

14. The gage of claim 13 including a bushing mount on said locating plate and a bushing connected to said bushing mount, said bushing and bushing mount each having an aperture coaxial with said locating plate aperture.

15. The gage of claim 14 wherein said spacer is connected to said indicator mount by a first set of fasteners and said locating plate and bushing mount are connected to said spacer by a second set of fasteners.

16. The gage of claim 15 wherein said bushing mount, locating plate, spacer, and indicator mount are connected together by a third set of fasteners.

17. The gage of claim 14 wherein the aperture of at least one of said bushing and bushing mount has a diameter equal to the largest acceptable diameter for said rotor shaft; said at least one of said bushing and bushing mount defining a rotor shaft outer diameter gage.

18. The gage of claim 10 wherein said gage support includes a bore formed therein, said bore including a floor having an aperture concentric with said bore, said bore aperture being coaxially aligned with said indicator mount bore; said indicator mount being received in said gage support bore; said indicator extending through said aperture of said support plate bore to be mounted to said indicator mount.

19. A gage for measuring extension of a rotor shaft beyond an end shield of a partially assembled electric motor, said rotor shaft having a connecting portion at an end thereof which is connectable to a device to be driven by said motor, said gage being positioned at a rotor assembly insertion station in an electric motor production line, said production line comprising a plurality of assembly stations including said rotor assembly insertion station, and a track which carries said motor between said stations, said gage including:

an indicator mount having a first surface, a second surface and an aperture extending between said first and second surfaces; said first surface facing said rotor shaft;

an indicator mounted to said indicator mount to extend from said second surface of said indicator mount, said indicator including a housing, and an indicator shaft extending from said housing and movable axially relative to said housing, said indicator shaft extending through said indicator mount aperture to be in alignment with said rotor shaft to be engaged by said rotor shaft, said indicator shaft being moved by said rotor shaft when said rotor shaft is inserted into said gage, said indicator further including a sensor in said housing responsive to the movement of said indicator shaft and creating an output indicative of the length of said rotor shaft extension; and a cup on an end of said indicator shaft, said cup fully receiving said connecting portion of said rotor shaft to prevent said connecting portion from moving said indicator shaft.

20. In a dynamoelectric machine production line, the production line including stations at which a various parts of a motor are assembled; said stations being connected by a track which carries a motor between said stations, one of said stations being a rotor insertion station at which a rotor assembly, including a rotor and a shaft, is inserted into a motor shell; said rotor insertion station including a lifter which raises said motor to hold said motor at the rotor insertion station; the improvement comprising a gage positioned at said rotor insertion station which measures both rotor shaft extension and rotor end play on said production line, said gage being positioned above said lifter; the gage including:

a rotor shaft receiving assembly having an upper member and a lower member arranged to define a chamber therebetween into which the rotor shaft is inserted, said upper and lower members each having an opening through which said chamber is accessible, said rotor shaft being insertable through one of said openings;

an indicator secured to said rotor shaft receiving assembly, said indicator including an indicator shaft extending into said chamber through the other of said openings, said indicator shaft being depressed by said rotor shaft when said rotor shaft is inserted into said chamber said indicator including a sensor responsive to the movement of said indicator shaft and creating an output indicative of the length of said rotor shaft extension; said indicator including a cup at a top of said indicator shaft, said rotor shaft including a shoulder spaced from a free end of said rotor shaft, the portion of said rotor shaft from said shoulder to said free end defining an end portion of said rotor shaft, said end portion of said rotor shaft being shorter than the depth of said cup such that said shoulder contacts an upper edge of said cup; and a display, operatively connected to said indicator sensor.

21. The improvement of claim 20 wherein said cup is removably secured to the top of said indicator shaft.

22. The improvement of claim 20 including a gage support, said rotor shaft receiving assembly being seated on said gage support.

23. The improvement of claim 22 wherein said rotor shaft receiving assembly upper member includes a locating plate spaced above said gage support, said gage including bolts extending upwardly from said gage support to said locating plate and springs journaled about said bolts between said support plate and said locating plate; said locating plate being slidably journaled on said bolts, said springs biasing said locating plate and hence said gage upwardly.

24. The improvement of claim 23 including a bushing supported above said locating plate, an extension positioned beneath said locating plate, and an indicator mount to which said indicator is secured, said indicator shaft extending up through said indicator mount.

25. The improvement of claim 24 wherein said bushing is supported on a bushing support, said bushing and bushing support each defining coaxial cylinders, at least one of said bushing and bushing support having an inner diameter equal to the largest acceptable diameter for said rotor shaft; said bushing and bushing support defining a rotor shaft outer diameter gage.

* * * * *